(12) United States Patent
Zhang et al.

(10) Patent No.: US 10,227,921 B2
(45) Date of Patent: Mar. 12, 2019

(54) SYSTEM FOR TURBINE COMBUSTOR FUEL MIXING

(71) Applicant: General Electric Company, Schenectady, NY (US)

(72) Inventors: Hua Zhang, Greer, SC (US); Tailai Hu, Lake Wylie, SC (US); Sudhakar Todeti, Bangalore (IN); Kenneth Eugene Selfridge, Piedmont, SC (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 432 days.

(21) Appl. No.: 14/961,131

(22) Filed: Dec. 7, 2015

(65) Prior Publication Data

US 2016/0084160 A1    Mar. 24, 2016

Related U.S. Application Data

(62) Division of application No. 13/280,265, filed on Oct. 24, 2011, now Pat. No. 9,243,804.

(51) Int. Cl.
*F02C 3/30* (2006.01)
*F23K 5/00* (2006.01)
(Continued)

(52) U.S. Cl.
CPC ............... *F02C 3/30* (2013.01); *F23K 5/005* (2013.01); *F23K 5/12* (2013.01); *F23L 7/002* (2013.01); *F23R 3/36* (2013.01)

(58) Field of Classification Search
CPC .... F02C 3/30; F23R 3/36; F23L 7/002; F23K 5/005; F23K 5/12
See application file for complete search history.

(56) References Cited

U.S. PATENT DOCUMENTS 2,560,941 A * 7/1951 Fisher ............... F23D 11/10
                                                  239/132.3
3,124,086 A * 3/1964 Sage et al. ............. F23C 3/008
                                                  110/264
(Continued)

FOREIGN PATENT DOCUMENTS

CN         1317634 A      10/2001
CN         1592817 A       3/2005
(Continued)

OTHER PUBLICATIONS

Norriseal "Valve Sizing Reference Guide"; Dated Oct. 10, 2008; 43 pages.

(Continued)

*Primary Examiner* — Ted Kim
(74) *Attorney, Agent, or Firm* — Fletcher Yoder, P.C.

(57) ABSTRACT

A system includes a plurality of interconnected mixing assemblies configured to mix a first fuel and water to generate a first mixture, and mix a second fuel and the water to generate a second mixture. The first and second fuel mixtures are configured to combust in a plurality of combustors of a gas turbine. The interconnected mixing assemblies include first and second fuel passages, a water passage, first and second mixers, first and second fuel valves, and first and second water valves disposed in an integrated housing. The first fuel valve has a first fuel flow coefficient between approximately 1.0 to 1.5, the second fuel valve has a second fuel flow coefficient between approximately 3.0 to 5.0, the first water valve has a first water flow coefficient between approximately 0.4 to 0.55, and the second water valve has a second water flow coefficient between approximately 3.5 to 5.0.

14 Claims, 7 Drawing Sheets

(51) Int. Cl.
*F23K 5/12* (2006.01)
*F23L 7/00* (2006.01)
*F23R 3/36* (2006.01)

(56) References Cited

U.S. PATENT DOCUMENTS

| | | | |
|---|---|---|---|
| 4,025,282 A | 5/1977 | Reed et al. | |
| 4,110,973 A | 9/1978 | Haeflich et al. | |
| 4,214,435 A | 7/1980 | Campbell | |
| 4,418,543 A | 12/1983 | Faucher et al. | |
| 4,798,330 A | 1/1989 | Mancini et al. | |
| 4,833,878 A | 5/1989 | Sood et al. | |
| 4,918,925 A * | 4/1990 | Tingle | F02C 7/228 60/739 |
| 4,977,740 A | 12/1990 | Madden et al. | |
| 4,993,918 A | 2/1991 | Myers et al. | |
| 5,175,994 A | 1/1993 | Fox et al. | |
| 5,240,741 A | 8/1993 | Edwards, III et al. | |
| 5,298,091 A | 3/1994 | Edwards, III et al. | |
| 5,324,544 A | 6/1994 | Spence et al. | |
| 5,448,890 A | 9/1995 | Coughlan, III et al. | |
| 5,628,184 A | 5/1997 | Santos | |
| 5,809,771 A | 9/1998 | Wernberg | |
| 6,125,624 A | 10/2000 | Prociw | |
| 6,145,294 A | 11/2000 | Traver et al. | |
| 6,250,065 B1 | 6/2001 | Mandai et al. | |
| 6,315,815 B1 | 11/2001 | Spadaccini et al. | |
| 6,367,239 B1 | 4/2002 | Brown et al. | |
| 6,385,960 B1 | 5/2002 | Kress et al. | |
| 6,397,602 B2 | 6/2002 | Vandervort et al. | |
| 6,427,447 B1 | 8/2002 | Sowa | |
| 6,434,945 B1 | 8/2002 | Mandai et al. | |
| 6,438,938 B1 | 8/2002 | Burkholder et al. | |
| 6,457,316 B1 | 10/2002 | Czachor et al. | |
| 6,598,383 B1 | 7/2003 | Vandervort et al. | |
| 6,668,541 B2 | 12/2003 | Rice et al. | |
| 6,679,060 B2 * | 1/2004 | Hellat | F02C 3/305 60/39.3 |
| 6,712,080 B1 | 3/2004 | Handschuh et al. | |
| 6,848,260 B2 | 2/2005 | North et al. | |
| 6,886,324 B1 | 5/2005 | Handschuh et al. | |
| 6,915,638 B2 | 7/2005 | Runkle et al. | |
| 6,918,255 B2 | 7/2005 | Kaplan et al. | |
| 6,931,853 B2 | 8/2005 | Dawson | |
| 6,935,116 B2 | 8/2005 | Stuttaford et al. | |
| 6,983,605 B1 | 1/2006 | Hook et al. | |
| 6,986,254 B2 | 1/2006 | Stuttaford et al. | |
| 7,007,476 B2 | 3/2006 | Mains et al. | |
| 7,104,070 B2 | 9/2006 | Iasillo et al. | |
| 7,117,675 B2 | 10/2006 | Kaplan et al. | |
| 7,137,242 B2 | 11/2006 | Griffiths | |
| 7,137,256 B1 | 11/2006 | Stuttaford et al. | |
| 7,143,582 B2 | 12/2006 | Kessler | |
| 7,690,184 B2 | 4/2010 | Gauthier et al. | |
| 8,347,631 B2 | 1/2013 | Bailey et al. | |
| 8,833,052 B2 | 9/2014 | Loven, II | |
| 8,973,366 B2 | 3/2015 | Zhang et al. | |
| 2003/0217555 A1 | 11/2003 | Gerhold | |
| 2008/0016875 A1 | 1/2008 | Ryan et al. | |
| 2009/0165435 A1 | 7/2009 | Koranek | |
| 2010/0058770 A1 | 3/2010 | Ryan | |
| 2011/0100015 A1 | 5/2011 | Alagappan et al. | |
| 2011/0130941 A1 | 6/2011 | Szepek et al. | |
| 2013/0098040 A1 | 4/2013 | Zhang et al. | |
| 2013/0098056 A1 | 4/2013 | Zhang et al. | |

FOREIGN PATENT DOCUMENTS

| | | |
|---|---|---|
| CN | 101832562 A | 9/2010 |
| CN | 102080602 A | 6/2011 |

OTHER PUBLICATIONS

Unofficial English translation of Office Action issued in connection with corresponding CN Application No. 201210410121.4 dated Aug. 5, 2015.

Extended European Search Report and Opinion issued in connection with corresponding EP Application No. 12189167.5 dated Nov. 7, 2017.

\* cited by examiner

SYSTEM FOR TURBINE COMBUSTOR FUEL MIXING

CROSS-REFERENCE TO RELATED APPLICATIONS

This application is a divisional of U.S. patent application Ser. No. 13/280,265, entitled "SYSTEM FOR TURBINE COMBUSTOR FUEL MIXING," filed Oct. 24, 2011, now U.S. Pat. No. 9,243,804, which is herein incorporated by reference in its entirety.

BACKGROUND OF THE INVENTION

The subject matter disclosed herein relates to combustion systems, and, more particularly, to supplying liquid fuel mixtures to gas turbine engines.

Various combustion systems include combustion chambers in which fuel and air combust to generate hot gases. For example, a gas turbine engine may include one or more combustion chambers that are configured to receive compressed air from a compressor, inject fuel into the compressed air, and generate hot combustion gases to drive the turbine engine. Each combustion chamber may be configured to receive one or more different fuels, such as gaseous fuels and liquid fuels. Certain materials may be mixed with the fuel to affect combustion efficiency and/or production of byproducts, for example. Unfortunately, such mixtures left in an unused flow path may degrade, thereby decreasing performance and reliability of the gas turbine engine.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a system includes a plurality of interconnected mixing assemblies. Each of the plurality of interconnected mixing assemblies is configured to mix a first fuel and water to generate a first mixture, and mix a second fuel and the water to generate a second mixture. The first and second mixtures are configured to combust in each of a plurality of combustors of a gas turbine. Each of the plurality of interconnected mixing assemblies includes a first fuel passage disposed in an integrated housing, a second fuel passage disposed in the integrated housing, and a water passage disposed in the integrated housing. The first fuel passage is configured to flow the first fuel, the second fuel passage is configured to flow the second fuel, and the water passage is configured to flow the water. Each of the plurality of interconnected mixing assemblies also includes a first mixer disposed in the integrated housing and coupled to the first fuel passage and the water passage, and a second mixer disposed in the integrated housing and coupled to the second fuel passage and the water passage. The first mixer is configured to mix the first fuel and the water to form the first mixture and the second mixer is configured to mix the second fuel and the water to form the second mixture. Each of the plurality of interconnected mixing assemblies also includes a first fuel valve coupled to the integrated housing, a second fuel valve coupled to the integrated housing, a first water valve coupled to the integrated housing, and a second water valve coupled to the integrated housing. The first fuel valve is configured to adjust a flow rate of the first fuel and has a first fuel flow coefficient between approximately 1.0 to 1.5, the second fuel valve is configured to adjust a flow rate of the second fuel and has a second fuel flow coefficient between approximately 3.0 to 5.0, the first water valve is configured to adjust a flow rate of the water mixed with the first fuel and has a first water flow coefficient between approximately 0.4 to 0.55, and the second water valve is configured to adjust a flow rate of the water mixed with the second fuel and has a second water flow coefficient between approximately 3.5 to 5.0. The integrated housing is configured with the first fuel valve, the second fuel valve, the first water valve, and the second water valve proximate to one another.

In a second embodiment, a system includes a plurality of interconnected valve assemblies. Each of the plurality of interconnected valve assemblies is configured to mix a pilot fuel and water to generate a pilot mixture, and mix a main fuel and the water to generate a main mixture. The pilot and main mixtures are configured to combust in each of a plurality of combustors of a gas turbine. Each of the plurality of interconnected valve assemblies includes an integrated housing, a pilot fuel valve directly coupled to the integrated housing, a main fuel valve directly coupled to the integrated housing, a pilot water valve directly coupled to the integrated housing, and a main water valve directly coupled to the integrated housing. The pilot fuel valve is configured to adjust a flow rate of the pilot fuel and has a pilot fuel flow coefficient, the main fuel valve is configured to adjust a flow rate of the main fuel and has a main fuel flow coefficient, the pilot water valve is configured to adjust a flow rate of the water to be mixed with the pilot fuel and has a pilot water flow coefficient, and the main water valve is configured to adjust a flow rate of the water to be mixed with the main fuel and has a main water flow coefficient. A ratio of the pilot water flow coefficient to the pilot fuel flow coefficient is between approximately 2:1 to 3:1, and a ratio of the main water flow coefficient to the main fuel flow coefficient is between approximately 0.9:1 to 1.15:1. The pilot fuel valve, the main fuel valve, the pilot water valve, and the main water valve are proximate to one another. The system also includes a controller configured to transmit a signal to at least one of the pilot fuel valve, the main fuel valve, the pilot water valve, or the main water valve. The at least one of the pilot fuel valve, the main fuel valve, the pilot water valve, or the main water valve is responsive to the signal to adjust a composition of the pilot mixture or the main mixture.

In a third embodiment, a system includes a plurality of interconnected valve assemblies. Each of the plurality of interconnected valve assemblies includes a main fuel inlet port configured to receive a main fuel, a main fuel passage coupled to the main fuel inlet port and configured to route the main fuel to a first mixing tee, a main fuel valve coupled to the main fuel passage, a water inlet port configured to receive water, a water passage coupled to the water inlet port and configured to route the water to the first mixing tee, a main fuel mixture outlet port configured to discharge the main fuel mixture, and a first water valve coupled to the water passage. The main fuel valve is configured to adjust a main flow rate of the main fuel and has a main fuel flow coefficient between approximately 3.0 to 5.0, the first mixing tee is configured to mix the main fuel and the water to generate a main fuel mixture, the first water valve is configured to adjust a first water flow rate of the water and has a first water flow coefficient between approximately 3.5 to 5.0, and the main fuel valve and the first water valve are proximate to one another.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

Figure 1:
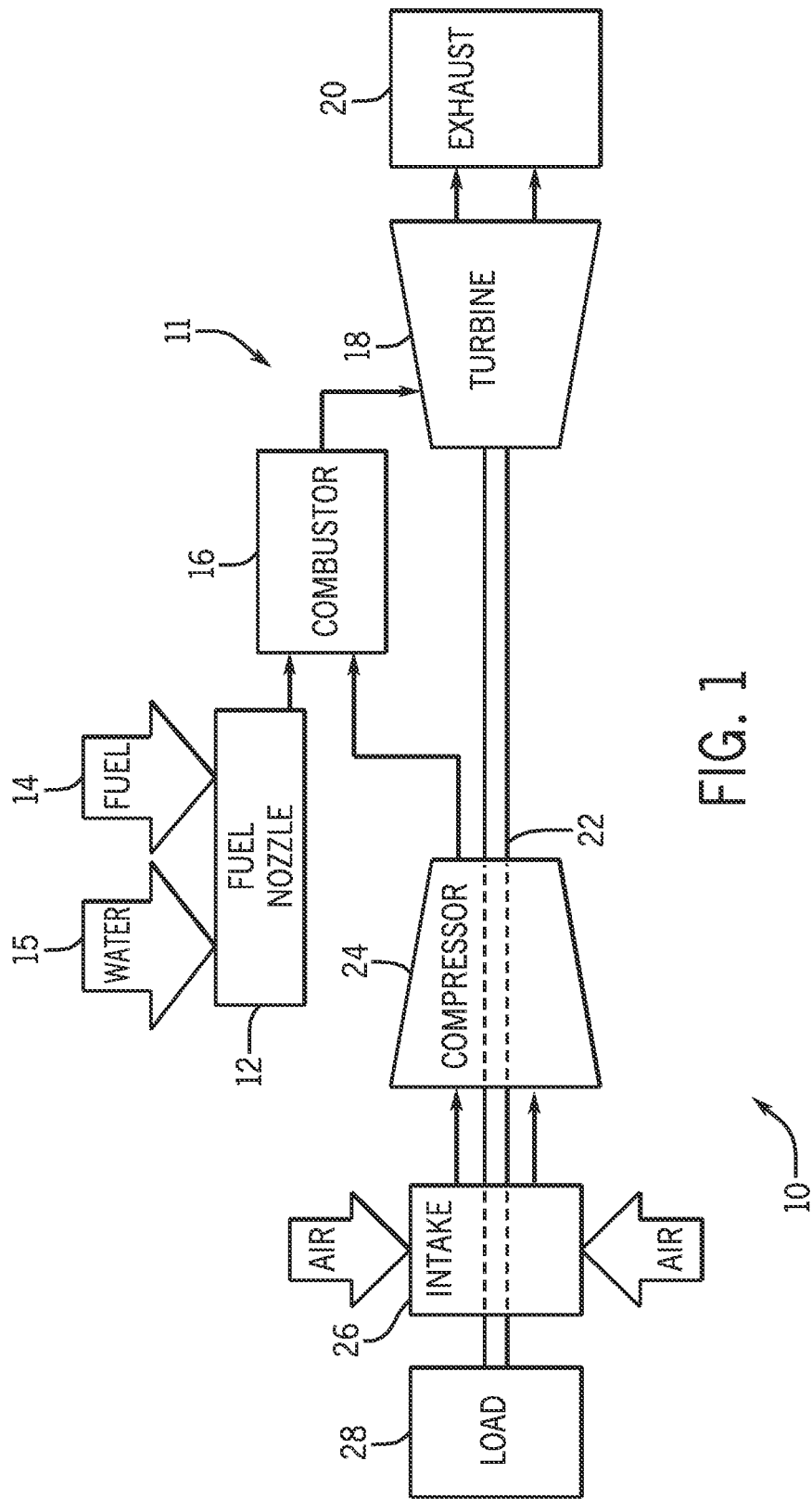
FIG. 1 is a block diagram of an embodiment of a turbine system having a combustor.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

As discussed in detail below, certain embodiments provide systems for mixing a fuel with water and supplying the mixture of fuel and water to a turbine combustor. For example, the turbine combustor may be one of a plurality of gas turbine combustors disposed in a gas turbine engine. In certain embodiments, the gas turbine combustors may combust either a gaseous fuel, such as natural gas, syngas, or substitute natural gas, or a liquid fuel, such as diesel fuel. The gaseous fuel may be supplied to the gas turbine combustors via gaseous fuel flow paths and the liquid fuel may be supplied via liquid fuel flow paths separate from the gaseous fuel flow paths. The gas turbine combustors may primarily combust the gaseous fuel and, when the gaseous fuel is unavailable, combust the liquid fuel. Thus, even if a supply of gaseous fuel is interrupted, operation of the turbine combustors may continue by using the liquid fuel. However, use of gaseous fuel may be preferable because combustion of the liquid fuel may be less efficient than combustion of the gaseous fuel, and because combustion of the liquid fuel may generate more byproducts in an exhaust from the gas turbine engine than combustion of the gaseous fuel. These byproducts may include nitrogen oxides ($NO_x$), sulfur oxides ($SO_x$), carbon monoxide (CO), particulate matter, and so forth.

When liquid fuel is used in the plurality of gas turbine combustors, water may be mixed with the liquid fuel prior to introduction into the gas turbine combustors to help reduce byproduct (e.g., $NO_x$, $SO_x$, CO, or particulate matter) production. The added water may aid in cooling the reaction zone in the gas turbine combustors, which may reduce byproduct production. Specifically, the water vaporizes into steam in the reaction zone, which helps to reduce the temperature of the reaction zone. In certain embodiments, a plurality of interconnected mixing assemblies may mix the water and liquid fuel to generate a fuel mixture for each of the plurality of gas turbine combustors. The mixing assemblies may be integrated housings that include a plurality of components. For example, the integrated housings may include liquid fuel passages that flow the liquid fuel through the integrated housings. Similarly, the integrated housings may include water passages that flow the water through the integrated housings. In further embodiments, each of the plurality of mixing assemblies may include a mixer disposed in the integrated housing and coupled to the liquid fuel passage and the water passage. The mixer may mix the liquid fuel and the water to form the fuel mixture. The mixer may improve the uniformity of the fuel mixture. Inadequately mixed fuel mixtures may cause uneven combustion within the gas turbine combustors.

In other embodiments, the integrated housings may include the fuel flow path, a water flow path, and/or a path for a mixture of both fuel and water. In further embodiments, the integrated housings may include additional components to help generate a uniform fuel mixture. For example, the liquid fuel passages may include liquid fuel valves that adjust a flow rate of the liquid fuel. Similarly, the water passages may include water valves that adjust a flow rate of the water. Flow coefficients of the liquid fuel valves and the water valves may be selected to reduce any variation in flow rates of the fuel and water flowing from each of the integrated housings to the gas turbine combustors. In addition, in certain embodiments, the liquid fuel valves and the water valves are proximate to one another. Thus, lengths of the passages within the integrated housings may be reduced to facilitate purging and cleanup of the integrated housings. In further embodiments, a controller may transmit a signal to the liquid fuel valves and/or the water valves to adjust a composition of the fuel mixture. The signal may be mechanical or electrical. In certain embodiments, water from the water valves may flow backward through the liquid fuel valves and the liquid fuel passages to help clean or purge any remaining oil left in the liquid fuel valves and liquid fuel passages.

Turning now to the drawings and referring first to FIG. 1, a block diagram of an embodiment of a turbine system 10 having a gas turbine engine 11 is illustrated. The turbine system 10 may use liquid or gaseous fuel, such as natural gas and/or a synthetic gas, to drive the turbine system 10. As depicted, one or more fuel nozzles 12 intake a fuel supply 14. For example, one or more fuel nozzles 12 may be used to intake liquid fuel, and one or more other fuel nozzles 12 may be used to intake gaseous fuel. In addition, the fuel nozzles 12 may intake a water supply 15 when the turbine system 10 uses liquid fuel. As described in detail below, the disclosed turbine system 10 mixes the liquid fuel with the water supply 15 upstream from and/or within the fuel nozzles 12. Mixing the liquid fuel with the water 15 may improve the efficiency of byproduct (e.g., $NO_x$, $SO_x$, CO, or particulate matter) suppression, thereby reducing production and exhaust of the byproducts from the gas turbine engine 11. The fuel nozzles 12 then further mix the fuel, or the fuel-water mixture, with air, and distribute the fuel, water (when used), and air mixture into the plurality of combustors 16, which may be arranged circumferentially about the gas turbine engine 11, where further mixing occurs between the fuel, water (when used), and air. Although shown schematically as being outside or separate from the combustors 16, the fuel nozzles 12 may be disposed inside the combustors 16. The fuel, water (when used), and air mixture combusts in a chamber within the combustors 16, thereby creating hot pressurized exhaust gases. The combustors 16 direct the exhaust gases through a turbine 18 toward an exhaust outlet 20. Each of the plurality of combustors 16 may include separate fuel nozzles 12. As the exhaust gases pass through the turbine 18, the gases force turbine blades to rotate a shaft 22 along an axis of the turbine system 10. As illustrated, the shaft 22 is connected to various components of the turbine system 10, including a compressor 24. The compressor 24 also includes blades coupled to the shaft 22. As the shaft 22 rotates, the blades within the compressor 24 also rotate, thereby compressing air from an air intake 26 through the compressor 24 and into the fuel nozzles 12 and/or combustors 16. The shaft 22 may also be connected to a load 28, which may be a vehicle or a stationary load, such as an electrical generator in a power plant or a propeller on an aircraft, for example. The load 28 may include any suitable device capable of being powered by the rotational output of turbine system 10.

Figure 2:
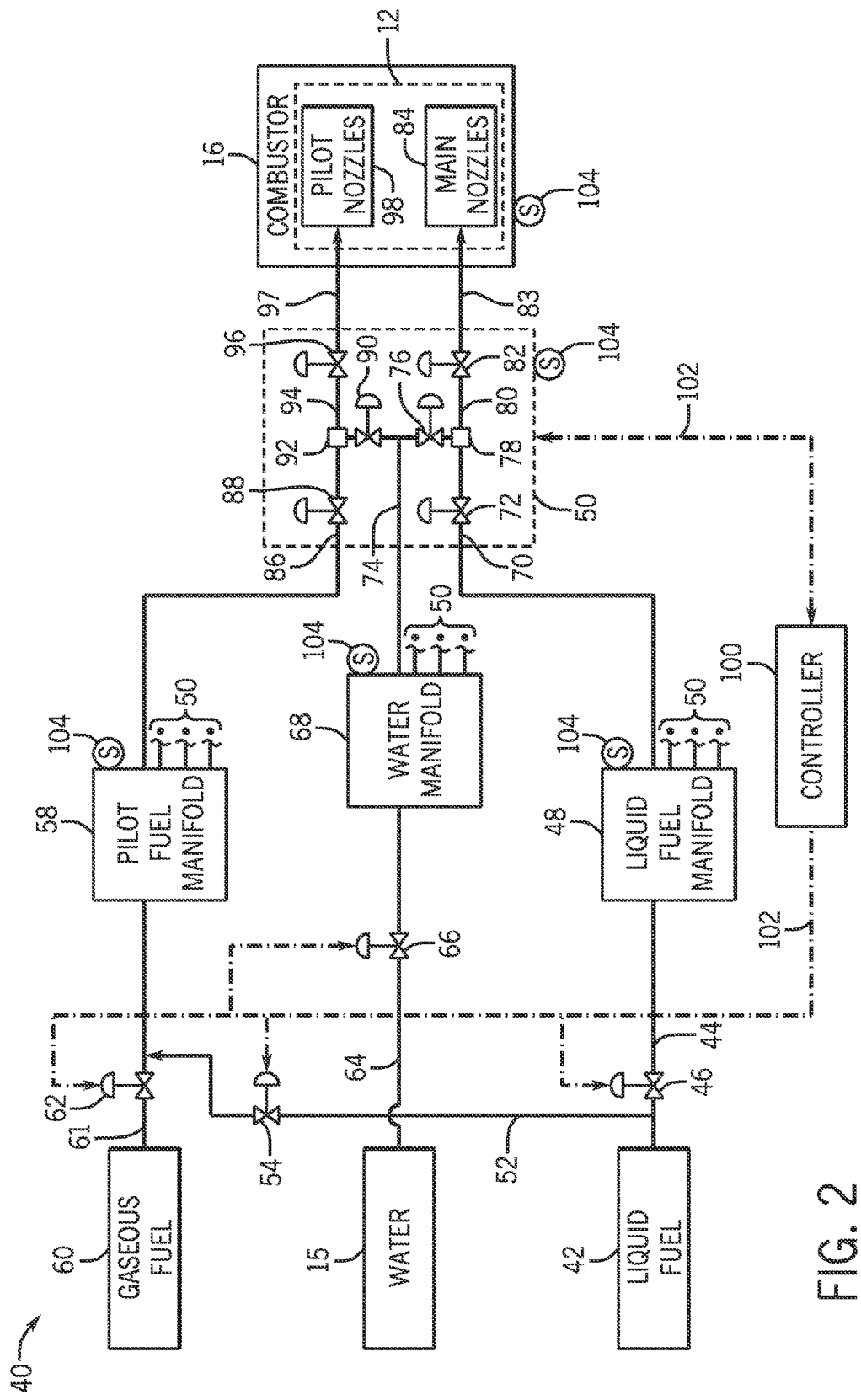
FIG. 2 is a block diagram of an embodiment of a fuel supply system for a turbine combustor.

FIG. 2 illustrates a block diagram of a turbine fuel supply system 40 for the combustors 16 of the gas turbine engine 11, as illustrated in FIG. 1. In the following discussion, the term "valve" is used to refer to any device capable of operating as a flow control. In addition, although only one combustor 16 is shown in FIG. 2, the turbine fuel supply system 40 may be used to supply the plurality of combustors 16 through the manifolds discussed in detail below. As illustrated, a liquid fuel 42 may be supplied to the combustor 16. Examples of the liquid fuel 42 include, but are not limited to, hydrocarbon based liquid fuels, such as diesel fuel, jet fuel, gasoline, naphtha, fuel oil, and so forth. The liquid fuel 42 is routed to the combustor 16 via a liquid fuel flow path 44, which may include a liquid fuel supply valve 46. The liquid fuel flow path 44 may also include a liquid fuel manifold 48, which may be used to supply the liquid fuel 42 to a plurality of mixing assemblies 50 (as indicated by vertical dots), which may be, for example, arranged circumferentially about the liquid fuel manifold 48. In certain embodiments, the liquid fuel manifold 48 may be configured as a ring with a circular or polygonal shape, as discussed in detail below. Each of the plurality of mixing assemblies 50 may be coupled to one of the plurality of combustors 16 arranged circumferentially about the gas turbine engine 11. The liquid fuel supply valve 46 may be used to adjust and/or isolate flow of the liquid fuel 42 to the liquid fuel manifold 48. In certain embodiments, each mixing assembly 50 may include a plurality of valves and passages, as discussed in detail below, to mix the liquid fuel 42 with the water 15.

In certain embodiments, a portion of the liquid fuel 42 may be routed to a pilot fuel flow path 52, which may include a pilot fuel supply valve 54. The pilot fuel flow path 52 may be used when first starting the combustor 16 with the liquid fuel 42. For example, the pilot fuel flow path 52 may flow a lower flow rate of the liquid fuel 42 than the liquid fuel flow path 44. In certain embodiments, the flow rate of the liquid fuel 42 through the pilot fuel flow path 52 may be between approximately 5 percent to 50 percent, 10 percent to 35 percent, or 15 percent to 25 percent of a normal, or regular, flow rate through the liquid fuel flow path 44. For example, the flow rate of the liquid fuel 42 through the pilot fuel flow path 52 may be approximately 5, 10, 15, 20, 25, 30, 35, 40, 45, or 50 percent of the normal flow rate through the liquid fuel flow path 44. A low flow rate of the liquid fuel 42, which may be referred to as pilot fuel, may be used to first start the combustor 16. Afterwards, the liquid fuel flow path 44 may be used to supply the normal, or regular, flow rate of the liquid fuel 42 to the combustor 16. The pilot fuel flow path 52 may also continue to be used together with the liquid fuel flow path 44 for reasons discussed in detail below. During startup of the combustor 16, the liquid fuel 42 from the pilot fuel supply valve 54 may be routed to a pilot fuel manifold 58, which may be used to supply pilot fuel to the plurality of mixing assemblies 50 (as indicated by vertical dots). In certain embodiments, the pilot fuel manifold 58 may be configured as a ring with a circular or polygonal shape, as discussed in detail below. The pilot fuel supply valve 54 may be used to adjust and/or isolate flow of the liquid fuel 42 to the pilot fuel manifold 58. When the combustor 16 is no longer combusting the liquid fuel 42, a gaseous fuel 60 may be supplied to the pilot fuel manifold 58 via a gaseous fuel flow path 61, thereby purging the liquid fuel 42 from the pilot fuel manifold 58 with the gaseous fuel 60. Examples of the gaseous fuel 60 include, but are not limited to, methane, natural gas, syngas, and so forth. The gaseous fuel flow path 61 may include a gaseous fuel supply valve 62, which may be used to adjust and/or isolate flow of the gaseous fuel 60. Purging the pilot flow path 52 with the gaseous fuel 60 may help to substantially reduce or prevent coking or oxidizing of the liquid fuel 42 in the pilot fuel flow path 52 when not in use. In other embodiments, other gases, such as nitrogen, carbon dioxide, steam, and so forth, may be used to purge the pilot fuel flow path 52 when not in use.

The water 15 may be supplied to the combustor 16 via a water flow path 64, which may include a water supply valve 66. Examples of the water 15 include, but are not limited to, boiler feedwater, deaerated water, steam condensate, demineralized water, and so forth. Such water 15 may already be available elsewhere in the plant or facility where the gas turbine engine 11 is located. Thus, the water supply system for the turbine fuel supply system 40 may not include a separate, dedicated water supply system. The water supply valve 66 may be used to adjust and/or isolate a flow of the water 15 to a water manifold 68, which may be used to supply the water 15 to the plurality of mixing assemblies 50 (as indicated by vertical dots). In certain embodiments, the water manifold 68 may be configured as a ring with a circular or polygonal shape, as discussed in detail below.

Each of the plurality of mixing assemblies 50 may include a variety of components to help produce uniform mixtures of the liquid fuel 42 and the water 15. For example, each mixing assembly 50 may include a liquid fuel passage 70 that flows the liquid fuel 42 to a liquid fuel mixing valve 72, which may be used to adjust a flow rate of the liquid fuel 42 through the mixing assembly 50. For example, the liquid fuel mixing valve 72 may be an on/off valve or a throttling valve. Similarly, the mixing assembly 50 may include a water passage 74 that flows the water 15 into the mixing assembly 50. The water passage 74 may include a liquid fuel water mixing valve 76, which may be used to adjust a flow rate of the water 15 to be mixed with the liquid fuel 42 flowing through the liquid fuel passage 70. For example, the liquid fuel water mixing valve 76 may be an on/off valve or a throttling valve. The liquid fuel 42 and the water 15 combine at a mixer 78 that mixes the liquid fuel 42 and the water 15 to form a liquid fuel mixture 80. In certain embodiments, the liquid fuel mixture 80 may be an emulsion of the liquid fuel 42 and the water 15. Examples of the mixer 78 include, but are not limited to, a mixing tee, an inline mixer, a static mixer, a paddle mixer, a blender, a ribbon blender, and so forth. The mixer 78 generates a uniform mixture of the liquid fuel 42 and the water 15. When the gas turbine engine 11 is not combusting the liquid fuel 42 (e.g., combusting the gaseous fuel 60), the water 15 may be used to purge the liquid fuel passage 70. Specifically, the water 15 may flow backward through the liquid fuel mixing valve 72 and into the liquid fuel manifold 48, purging or displacing the liquid fuel 42. In certain embodiments, the mixing assembly 50 may include a liquid fuel proportioning valve 82 disposed downstream of the mixer 78. In certain embodiments, the proportioning valve 82 may be referred to as a pressurizing valve. The liquid fuel proportioning valve 82 may enable the flow of the liquid fuel mixture 80 along a main fuel flow path 83 to the appropriate combustor 16 of the gas turbine engine 11 if a pressure of the liquid fuel mixture 80 is above a threshold pressure. For example, the liquid fuel proportioning valve 82 may be a control valve, pressure valve, one-way valve, check valve, or any combination thereof. Thus, the liquid fuel proportioning valve 82 may help prevent backflow of gases from the combustor 16 into the mixing assembly 50. In other words, the liquid fuel proportioning valve 82 may enable flow of the liquid fuel mixture 80 into the combustor 16 only when the pressure of the liquid fuel mixture 80 exceeds a preset pressure. The liquid fuel mixture 80 from the mixing assembly 50 may then be routed to main nozzles 84 of the combustor 16 along the main fuel flow path 83.

In certain embodiments, the mixing assembly 50 may include a pilot fuel passage 86 that routes the pilot fuel to a pilot fuel mixing valve 88, which may be used to adjust a flow rate of the pilot fuel to the mixing assembly 50. For example, the pilot fuel mixing valve 88 may be an on/off valve or a throttling valve. The water passage 74 may include a pilot fuel water mixing valve 90 that flows the water 15 to a pilot fuel mixer 92, which may mix the pilot fuel and the water 15 to form a pilot fuel mixture 94. In certain embodiments, the pilot fuel mixture 94 may be an emulsion of the pilot fuel and the water 15. For example, the pilot fuel water mixing valve 90 may be an on/off valve or a throttling valve. Examples of the pilot fuel mixer 92 include, but are not limited to, a mixing tee, an inline mixer, a static mixer, a paddle mixer, a blender, a ribbon blender, and so forth. When the gas turbine engine 11 is not combusting the liquid fuel 42 (e.g., combusting the gaseous fuel 60), the water 15 may be used to purge the pilot fuel passage 86. Specifically, the water 15 may flow backward through the pilot fuel mixing valve 88 and into the pilot fuel manifold 58, purging or displacing the liquid fuel 42. In some embodiments, the pilot fuel mixture 94 may be routed to a pilot fuel pressurizing valve 96, which may enable flow of the pilot fuel mixture 94 along a pilot fuel flow path 97 if a pressure of the pilot fuel mixture 94 is above a threshold pressure. For example, the pilot fuel pressurizing valve 96 may be a control valve, pressure valve, one-way valve, check valve, or any combination thereof. Thus, the pilot fuel pressurizing valve 96 may help to prevent backflow of gases from the combustor 16 into the mixing assembly 50. In certain embodiments, the pressurizing valve 96 may be referred to as a proportioning valve. The pilot fuel mixture 94 from the pilot fuel pressurizing valve 96 may then be routed to pilot nozzles 98 of the combustor 16 along the pilot fuel flow path 97. The pilot nozzles 98 may be smaller than the main nozzles 84 to enable the pilot nozzles 98 to inject the liquid fuel 42 into the combustor 16 at a lower flow rate than the main nozzles 84, but with enough nozzle pressure drop to generate an ignitable spray of liquid fuel. The pilot nozzles 98 may be continuously purged with the gaseous fuel 60 when the combustor 16 is not combusting the liquid fuel 42 to help block hot combustion products (e.g., air, carbon dioxide, water vapor, and so forth) from entering and degrading the small orifices of the pilot nozzles 98. When the combustor 16 is combusting the liquid fuel 42, the pilot nozzles 98 may inject the liquid fuel 42 concurrently with the main nozzles 84 as the pilot nozzles 98 may be cooled by the flow of the pilot fuel mixture 94 through the pilot nozzles 98.

In certain embodiments, the turbine fuel supply system 40 may include a controller 100, which may send and/or receive various signals along signal paths 102. In the following discussion, the signals sent or received along the signal paths 102 will also be referred to by the reference numeral 102. For example, the controller 100 may send signals 102 to one or more of the liquid fuel supply valve 46, the pilot fuel supply valve 54, the gaseous fuel supply valve 62, the water supply valve 66, the liquid fuel mixing valve 72, the liquid fuel water mixing valve 76, the liquid fuel proportioning valve 82, the pilot fuel mixing valve 88, the pilot fuel water valve 90, and the pilot fuel pressurizing valve 96 to direct the valves to open or close. In addition, the controller 100 may receive signals 102 from sensors 104 disposed in the turbine fuel supply system 40, such as, but not limited to, pressure sensors, temperature sensors, flow rate sensors, composition sensors, and so forth. In certain embodiments, the controller 100 may adjust a ratio of the liquid fuel 42 to the water 15 based on the signals 102 received from the sensors 104.

Figure 3:
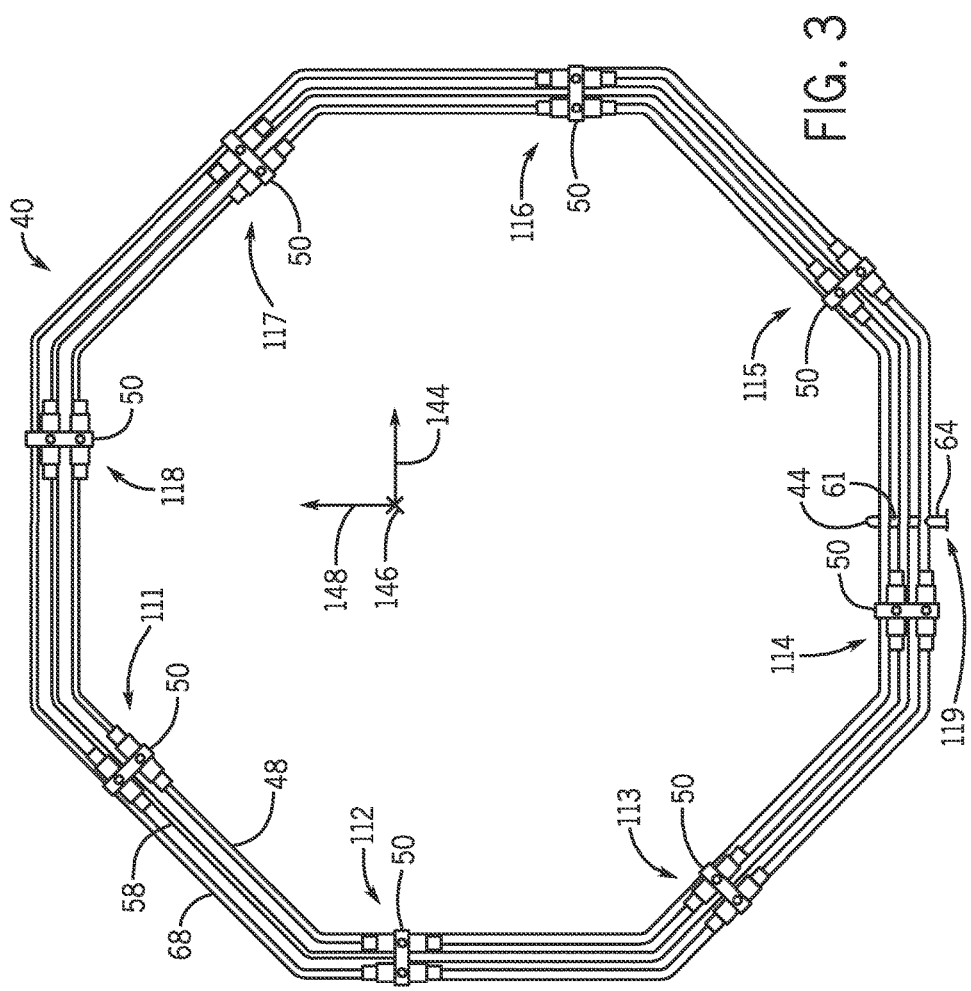
FIG. 3 is a perspective view of an embodiment of a fuel supply system for a turbine combustor.

FIG. 3 illustrates a perspective view of an embodiment of the turbine fuel supply system 40. In the following discussion, reference may be made to an x-axis 144, a y-axis 146, and a z-axis 148. In certain embodiments, the axis of the turbine system 10 may be generally aligned with the y-axis 146. As shown in FIG. 3, the liquid fuel manifold 48, the pilot fuel manifold 58, and the water manifold 68 are arranged concentrically about the y-axis 146. Specifically, in certain embodiments, the water manifold 68 surrounds the pilot fuel manifold 58, which surrounds the liquid fuel manifold 48. In other embodiments, the order of the manifolds 48, 58, and 68 may be different. In the illustrated embodiment, the manifolds 48, 58, and 68 are octagonal in shape. In addition, in the illustrated embodiment, eight interconnected mixing assemblies 50, corresponding to eight combustors 16, are coupled to the manifolds 48, 58, and 68. Specifically, the eight mixing assemblies 50 are placed in a first position 111, a second position 112, a third position 113, a fourth position 114, a fifth position 115, a sixth position 116, a seventh position 117, and an eighth position 118. As shown, the eight mixing assemblies 50 are evenly distributed about the manifolds 48, 58, and 68 generally corresponding to positions of the eight combustors 16 uniformly spaced about the y-axis 146 of the gas turbine engine 11. In other embodiments, the manifolds 48, 58, and 68 may be circular or have other polygonal shapes corresponding to different numbers of combustors 16. For example, in one embodiment, the manifolds 48, 58, and 68 may be coupled to sixteen mixing assemblies 50. In certain embodiments, the liquid fuel flow path 44, the gaseous fuel flow path 61, and the water flow path 64 are coupled to the manifolds 48, 58, and 68 near a bottom 119 of the manifolds 48, 58, and 68. Thus, the manifolds 48, 58, and 68 may be filled from the bottom to the top. In other embodiments, the paths 44, 61, and 64 may be coupled to the manifolds 48, 58, and 68 at other positions. Details regarding the configuration of the mixing assemblies 50 are described in further detail below.

As shown in FIG. 3, the mixing assemblies 50 are located at different elevations with respect to the bottom 119 of the manifolds 48, 58, and 68. For example, the mixing assembly 50 located at the fourth position 114 is located at approximately the same elevation as the bottom 119 and the mixing assembly 50 located at the eighth position 118 is located at an elevation furthest away from the bottom 119. The pressure exerted by the fluids located in the manifolds 48, 58, and 68 as a result of gravity may differ throughout the manifolds 48, 58, and 68 because of the elevation differences between the different positions. Thus, the pressure exerted by the fluids located near the bottom 119 may be greater than the pressure exerted by the fluids elsewhere in the manifolds 48, 58, and 68. As a result of these pressure differences and other hydraulic effects, flow variations may occur even though the valves in the mixing assemblies 50 are identical to one another. For example, the valves in the mixing assembly 50 located in the fourth position 114 may be expected to flow fluids at higher flow rates than identical valves in the mixing assembly 50 located in the eighth position 118. Such flow variations may cause each of the plurality of combustors 16 to operate differently from one another, which may cause abnormal exhaust spread from the gas turbine engine 11 and/or burning of crossfire tubes between the plurality of combustors 16. Thus, flow characteristics of the valves in the mixing assemblies 50 may be adjusted to reduce the flow variations, as described in detail below.

Figure 4:
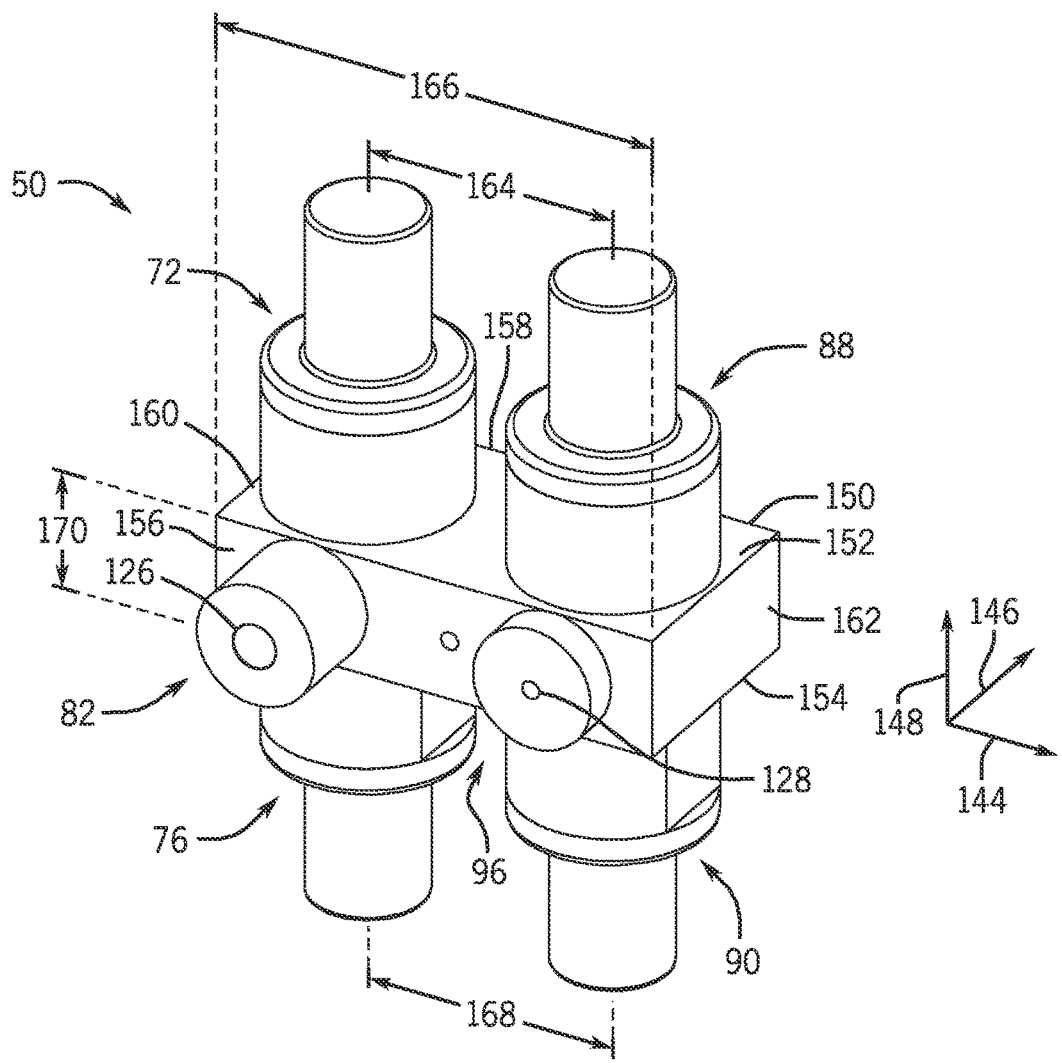
FIG. 4 is a perspective view of an embodiment of an integrated valve assembly.

FIG. 4 illustrates a perspective view of an embodiment of the mixing assembly 50. As shown in FIG. 4, the mixing assembly 50 includes an integrated housing 150, or integrated valve assembly. The integrated housing 150 includes a top side 152, a bottom side 154, a front side 156, a back side 158, a left side 160, and a right side 162. As shown in FIG. 4, the integrated housing 150 may be a generally rectangular shaped assembly. However, in other embodiments, the integrated housing 150 may have other shapes to accommodate the particular arrangement of the turbine fuel supply system 40. In addition, the integrated housing 150 may include a plurality of openings, or ports, to accommodate connections to equipment of the turbine fuel supply system 40. Further, in certain embodiments, the actuators of the liquid fuel mixing valve 72 and the pilot fuel mixing valve 88 may be located on the top side 152. Similarly, in certain embodiments, the actuators for the liquid fuel water mixing valve 76 and the pilot fuel water mixing valve 90 may be located on the bottom side 154. Thus, the actuators for the valves 72, 76, 88, and 90, may be oriented along multiple axes to reduce the space or volume taken up by the valves 72, 76, 88, and 90. In other embodiments, the actuators for the various valves 72, 76, 88, and 90 may be located in different locations of the integrated housing 150. The valves 72, 76, 82, 88, 90, and 96 may be coupled directly to the integrated housing 150 and at least partially disposed in bores or openings drilled or formed in the integrated housing 150. In addition, the main fuel outlet port 126 may be located at the center of the liquid fuel proportioning valve 82, and the pilot fuel outlet port 128 may be located at the center of the pilot fuel pressurizing valve 96. In other embodiments, the main fuel outlet port 126 and the pilot fuel outlet port 128 may be located in different locations of the integrated housing 150. As shown in FIG. 4, the valves 72, 76, 82, 88, 90, and 96 of the integrated housing 150 are proximate to one another. For example, a distance 164 between centerlines of the valves 72 and 88 may be between approximately 30 to 80 percent, 40 to 70 percent, or 50 to 60 percent of a width 166 of the integrated housing 150. Similarly, a distance 168 between centerlines of the valves 76 and 90 may be between approximately 30 to 80 percent, 40 to 70 percent, or 50 to 60 percent of the width 166 of the integrated housing 150. Thus, the distances 164 and/or 168 may be approximately 30, 40, 50, 60, 70, or 80 percent of the width 166. Further, the valves 72 and 76 may be separated by a height 170 of the integrated housing 150. Similarly, the valves 88 and 90 may be separated by the height 170 of the integrated housing 150. Thus, the integrated housing 150 may be compact with a reduced volume to reduce the amount of the liquid fuel 42 that may degrade inside the integrated housing 150. Further, the length of passages between the valves 72, 76, 82, 88, 90, and 96 may be reduced to facilitate purging and cleaning of the integrated housing 150.

Figure 5:
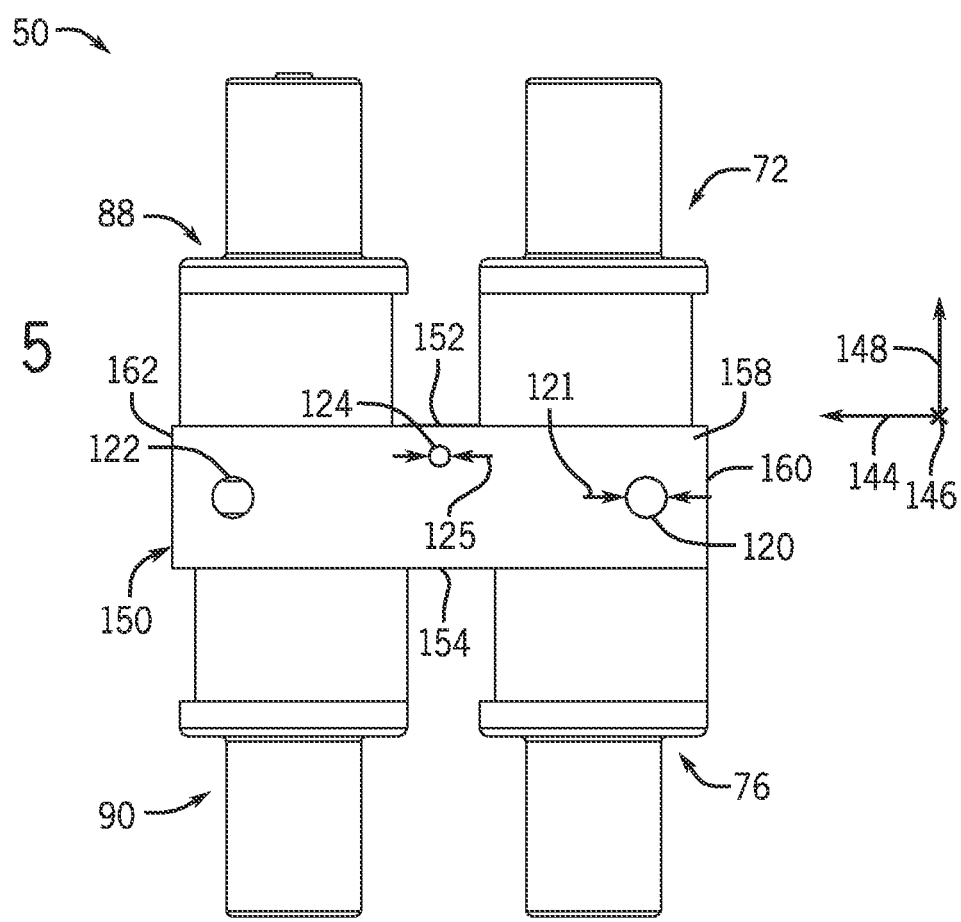
FIG. 5 is a rear view of an embodiment of an integrated valve assembly.

FIG. 5 illustrates a rear view of an embodiment of the mixing assembly 50. As shown in FIG. 5, the back side 158 includes main fuel inlet port 120, water inlet port 122, and pilot fuel inlet port 124. In certain embodiments, the main fuel inlet port 120 is located near the side 160 and adjacent to the liquid fuel mixing valve 72. In certain embodiments, the water inlet port 122 is located near the side 162 and adjacent to the pilot fuel water mixing valve 90. In some embodiments, the pilot fuel inlet port 124 is located near the middle of the back side 158, or in between the main fuel inlet port 120 and the water inlet port 122. In certain embodiments, a diameter 121 of the main fuel inlet port 120 may be greater than a diameter 125 of the pilot fuel inlet port 124 because a flow rate of the liquid fuel 42 along path 44 may be greater than a flow rate of the pilot fuel along path 52. For example, a ratio of the diameter 121 to the diameter 125 may be between approximately 1.1:1 to 6:1, 1.3:1 to 4:1, or 1.5:1 to 2.5:1. In certain embodiments, the ratio of the diameter 121 to the diameter 125 may be approximately 1.1, 1.3, 1.5, 2, 2.5, 3, 4, 5, or 6. In another embodiment, the water inlet port 122 may be located near the middle of the back side 158, or in between the main fuel inlet port 120 and the pilot fuel inlet port 124.

Figure 6:
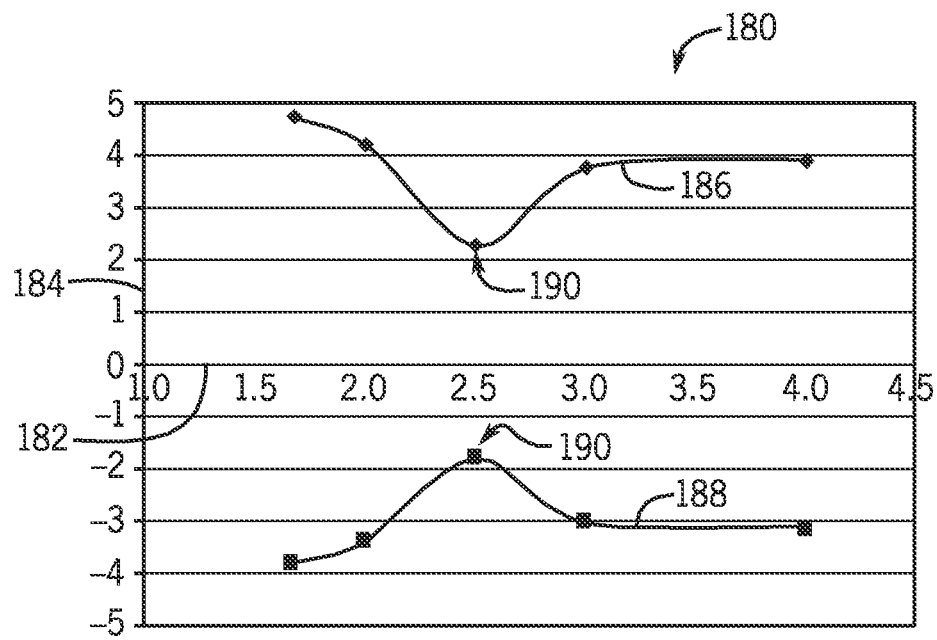
FIG. 6 is a graph of water to pilot fuel variation as a function of water and pilot fuel valve flow coefficients for an embodiment of a portion of a fuel supply system.

FIG. 6 is a graph 180 of water to pilot fuel variation as a function of water and pilot fuel valve flow coefficients for an embodiment of the turbine fuel supply system 40 with sixteen mixing assemblies 50. The data shown in the graph 180 may be obtained using process simulation programs, wet rig tests, operating data, and so forth. Specifically, an x-axis 182 represents a ratio of a flow coefficient for the pilot fuel mixing valve 88 to a flow coefficient for the pilot fuel water mixing valve 90. In general, the flow coefficient of a valve is a relative measure of its efficiency at allowing fluid flow. In other words, the flow coefficient describes a relationship between a pressure drop across the valve and a corresponding flow rate of fluid through the valve and may be represented by the symbol $C_v$. Certain components of valves, such as trims, may be configured to be replaceable to enable the flow coefficient of the valve to be adjusted.

A y-axis 184 represents the flow variations caused by the configuration of the manifolds 48, 58, and 68, as discussed above. Specifically, the pilot fuel water valve 90 of each of the plurality of mixing assemblies 50 may be configured to deliver a nominal flow rate of water 15. Similarly, the pilot fuel mixing valve 88 may be configured to deliver a nominal flow rate of pilot fuel. The two nominal flow rates may be divided by one another to yield a nominal ratio of water 15 to pilot fuel. However, as discussed above, each of the valves of the plurality of mixing assemblies 50 may be expected to deliver different flow rates because of their vertical positions in the manifolds 48, 58, and 68. For example, the valves in the mixing assembly 50 located near the bottom 119 of the manifolds 48, 58, and 68 shown in FIG. 3 may deliver actual flow rates of water 15 and/or pilot fuel greater than the nominal flow rates. Thus, an actual ratio of an actual flow rate of water 15 to an actual flow rate of pilot fuel may be different from the nominal ratio. Thus, the y-axis 184 of FIG. 6 shows the percentage difference between the nominal ratio and the actual ratio of the mixing assembly 50 over a range of flow coefficient ratios. For example, line 186 represents the performance of the mixing assembly 50 located near the fourth position 114 (e.g., located near the bottom 119) of a turbine fuel supply system 40 with sixteen mixing assemblies 50 and line 188 represents the performance of the mixing assembly 50 located near the eighth position 118 (e.g., located furthest away from the bottom 119). As may be expected, the line 186 has a positive percentage difference from the nominal ratio and the line 188 has a negative percentage difference from the nominal ratio. In other words, the mixing assembly 50 located near the fourth position 114 may be expected to have an actual ratio greater than the nominal ratio and the mixing assembly 50 located near the eighth position 118 may be expected to have an actual ratio less than the nominal ratio.

As shown in FIG. 6, the difference between the nominal and actual ratios is not the same for different ratios of flow coefficients. For example, near a point 190, the absolute percentage difference may be a minimum for both lines 186 and 188. As shown in FIG. 6, point 190 may correspond to a ratio of flow coefficients of approximately 2.5. Adding additional lines for the other mixing assemblies 50 may indicate that a minimum percentage difference between the nominal and actual ratios may occur at approximately the same ratio of flow coefficients for all the plurality of mixing assemblies 50. Thus, the point 190 may represent a desired ratio of flow coefficients to use for the pilot fuel water valve 90 and the pilot fuel mixing valve 88 that reduces the flow variations caused by the geometry of the manifolds 48, 58, and 68 to an acceptable level. In other embodiments, the desired ratio of the flow coefficients may be between approximately 1.6:1 to 3.8:1, 1.8:1 to 3.4:1, or 2:1 to 3:1. In certain embodiments, a flow coefficient may be selected for one of the pilot fuel water valve 90 and the pilot fuel mixing valve 88, and the desired ratio corresponding to point 190 used to determine the flow coefficient of the second of the two valves 90 and 88. In one embodiment, the flow coefficient selected for the pilot fuel mixing valve 88 may be approximately 1.0. The value of the flow coefficient for the pilot fuel mixing valve 88 may be determined using common processing engineering techniques used in valve sizing that take into account various factors such as, but not limited to, desired flow rates, specific gravity of the fluid, desired pressure drop, and so forth. Dividing the selected flow coefficient of 1.0 by the desired ratio of 2.5 results in a flow coefficient for the pilot fuel water valve 90 of approximately 0.4. In other embodiments, the flow coefficient for the pilot fuel mixing valve 88 may be between approximately 0.8 to 1.7, 0.9 to 1.6, or 1 to 1.5 and the flow coefficient for the pilot fuel water valve 90 may be between approximately 0.2 to 0.75, 0.3 to 0.65, or 0.4 to 0.55. In certain embodiments, when flow coefficients such as these are used, the flow variation between the mixing assemblies may be reduced by more than approximately 50%.

Figure 7:
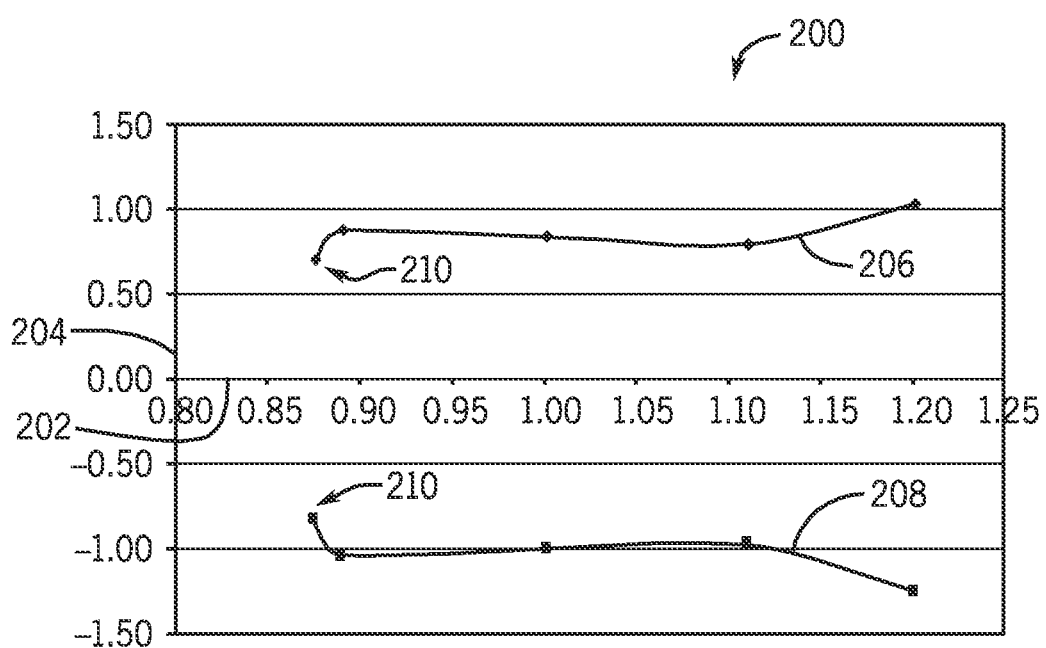
FIG. 7 is a graph of water to main fuel variation as a function of water and main fuel valve flow coefficients for an embodiment of a portion of a fuel supply system.

FIG. 7 is a graph 200 of water to main fuel variation as a function of water and main fuel valve flow coefficients for an embodiment of the turbine fuel supply system 40 with sixteen mixing assemblies 50. The data shown in the graph 200 may be obtained using process simulation programs, wet rig tests, operating data, and so forth. Specifically, an x-axis 202 represents a ratio of a flow coefficient for the liquid fuel mixing valve 72 to a flow coefficient for the liquid fuel water mixing valve 76. A y-axis 204 represents the flow variations caused by the configuration of the manifolds 48, 58, and 68, as discussed above. Specifically, the liquid fuel water mixing valve 76 of each of the plurality of mixing assemblies 50 may be configured to deliver a nominal flow rate of water 15. Similarly, the liquid fuel mixing valve 72 may be configured to deliver a nominal flow rate of liquid fuel 42, or main fuel. The two nominal flow rates may be divided by one another to yield a nominal ratio of water 15 to main fuel. However, as discussed above, each of the valves of the plurality of mixing assemblies 50 may be expected to deliver different flow rates because of their vertical positions in the manifolds 48, 58, and 68. Thus, an actual ratio of an actual flow rate of water 15 to an actual flow rate of main fuel may be different from the nominal ratio. Thus, the y-axis 204 of FIG. 7 shows the percentage difference between the nominal ratio and the actual ratio of the mixing assembly 50 over a range of flow coefficient ratios. For example, line 206 represents the performance of the mixing assembly 50 located near the fourth position 114 (e.g., located near the bottom 119) of a turbine fuel supply system 40 with sixteen mixing assemblies 50 and line 208 represents the performance of the mixing assembly 50 located near the eighth position 118 (e.g., located furthest away from the bottom 119). As may be expected, the line 206 has a positive percentage difference from the nominal ratio and the line 208 has a negative percentage difference from the nominal ratio. In other words, the mixing assembly 50 located near the fourth position 114 may be expected to have an actual ratio greater than the nominal ratio and the mixing assembly 50 located near the eighth position 118 may be expected to have an actual ratio less than the nominal ratio.

As shown in FIG. 7, the difference between the nominal and actual ratios is not the same for different ratios of flow coefficients. For example, near a point 210, the absolute percentage difference may be a minimum for both lines 206 and 208. As shown in FIG. 7, point 210 may correspond to a ratio of flow coefficients of approximately 0.9. Adding additional lines for the other mixing assemblies 50 may indicate that a minimum percentage difference between the nominal and actual ratios may occur at approximately the same ratio of flow coefficients for all the plurality of mixing assemblies 50. Thus, the point 210 may represent a desired ratio of flow coefficients to use for the liquid fuel water mixing valve 76 and the liquid fuel mixing valve 72 that reduces the flow variations caused by the geometry of the manifolds 48, 58, and 68 to an acceptable level. In other embodiments, the desired ratio of the flow coefficients may be between approximately 0.6:1 to 1.45:1, 0.75:1 to 1.3:1, or 0.9:1 to 1.15:1. In certain embodiments, a flow coefficient may be selected for one of the liquid fuel water mixing valve 76 and the liquid fuel mixing valve 72, and the desired ratio corresponding to point 210 used to determine the flow coefficient of the second of the two valves 76 and 72. In one embodiment, the flow coefficient selected for the liquid fuel mixing valve 72 may be approximately 3.5. As discussed above, the value of the flow coefficient for the liquid fuel mixing valve 72 may be determined using common processing engineering techniques used in valve sizing. Dividing the selected flow coefficient of 3.5 by the desired ratio of 0.9 results in a flow coefficient for the liquid fuel water mixing valve 76 of approximately 4.0. In other embodiments, the flow coefficient for the liquid fuel mixing valve 72 may be between approximately 2.6 to 5.4, 2.8 to 5.2, or 3 to 5 and the flow coefficient for the liquid fuel water mixing valve 76 may be between approximately 3.1 to 5.4, 3.3 to 5.2, or 3.5 to 5. In certain embodiments, when flow coefficients such as these are used, the flow variation between the mixing assemblies may be reduced by more than approximately 50%.

Figure 8:
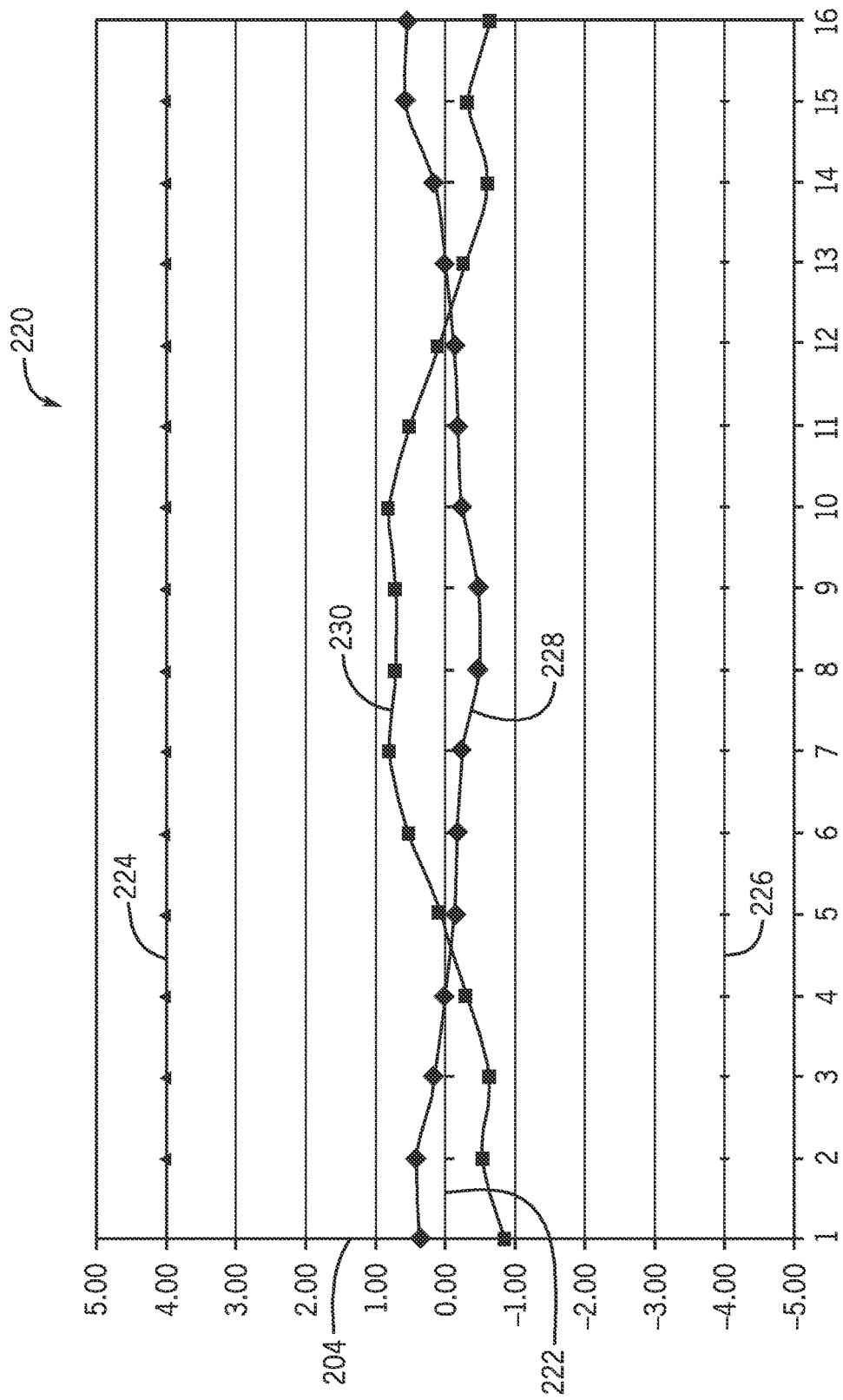
FIG. 8 is a graph of water to main fuel variation as a function of combustor position for an embodiment of a fuel supply system.

FIG. 8 is a graph 220 of water to main fuel variation as a function of combustor position for an embodiment of the turbine fuel supply system 40 in which the desired ratios of flow coefficients discussed above have been used to select the flow coefficients for the valves of the plurality of mixing assemblies 50. The data shown in the graph 220 may be obtained using process simulation programs, wet rig tests, operating data, and so forth. Specifically, an x-axis 222 represents the positions of the plurality of combustors 16 and plurality of mixing assemblies 50 for a turbine fuel supply system 40 with sixteen positions. A y-axis 204 represents the flow variations in the water to main fuel ratio caused by the configuration of the manifolds 48, 58, and 68, as discussed above. Line 224 represents an upper limit for flow variations for acceptable performance of the gas turbine engine 11 and line 226 represents a lower limit. In the illustrated embodiment, flow variations exceeding approximately 4% may cause undesirable operation of the gas turbine engine 11. Line 228 represents the flow variations at a base load of the gas turbine engine 11 and line 230 represents the flow variations at a 50% load. In the illustrated embodiment, the flow coefficients for the liquid fuel mixing valve 72 and the liquid fuel water mixing valve 76 are approximately 3.5 and 4.0, respectively. As shown in FIG. 8, some flow variability exists between the plurality of mixing assemblies 50. However, the flow variability at both base load and 50% load are within the upper and lower limits designated by lines 224 and 226, respectively. Similar performance within the upper and lower limits may be obtained when the flow coefficients for the pilot fuel mixing valve 88 and pilot fuel water mixing valve 90 are selected to be approximately 1.0 and 0.4, as described in detail above. Using the selected flow coefficients for the plurality of mixing assemblies 50, embodiments of the gas turbine engine 11 with the turbine fuel supply system 40 may be expected to have a normal exhaust spread and reduced potential for burning of crossfire tubes between the plurality of combustors 16.

As discussed above, various embodiments of the turbine fuel supply system 40 include the plurality of mixing assemblies 50 to provide mixing of the liquid fuel 42 with the water 15 upstream of the plurality of combustors 16 to form the liquid fuel and pilot fuel mixtures 80 and 94. Such mixing of the water 15 with the liquid fuel 42 may help to reduce temperatures within the combustors 16 and help reduce formation of byproducts, such as $NO_x$. Premixing of the water 15 and the liquid fuel 42 may also be more efficient at reducing $NO_x$ generation than injecting the water 15 into the combustors 16. For example, the liquid fuel and pilot fuel mixtures 80 and 94 may have a lower viscosity and surface tension than the liquid fuel 42, thereby improving atomization, dispersion, and the evaporation rate of the mixtures 80 and 94 in the combustors 16. Thus, use of the mixing assemblies 50 enables less water 15 to be used in reducing $NO_x$ generation because of the greater efficiency of $NO_x$ suppression provided by the mixtures 80 and 94. Further, the arrangement of the valves 72, 76, 88, and 90 (and optionally valves 82 and 96) in close proximity to one another within the mixing assemblies 50 may facilitate purging and cleanup of the turbine fuel supply system 40 when not using the liquid fuel 42. Specifically, the configuration of the integrated housing 150 helps to reduce the amount of the liquid fuel 42 that is purged from the turbine fuel supply system 40, thereby improving the effectiveness of cleaning up any remaining liquid fuel 42. Thus, use of the mixing assemblies 50 may facilitate switching the combustors 16 to and from combustion of the liquid fuel 42. Further, flow coefficients may be selected for the valves 72, 76, 88, and 90 to help reduce flow variations caused by the arrangement of the manifolds 48, 58, and 68. The desired flow coefficients may be determined by graphing the flow variations as a function of ratios of flow coefficients for one of more of the plurality of mixing assemblies 50 and selecting a ratio that results in reduced flow variations.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A system, comprising:
a plurality of interconnected valve assemblies disposed at a plurality of different vertical positions, wherein each of the plurality of interconnected valve assemblies comprises:
a main fuel inlet port configured to receive a main fuel;
a main fuel passage coupled to the main fuel inlet port and configured to route the main fuel to a first mixing tee;
a main fuel valve coupled to the main fuel passage, wherein the main fuel valve is configured to adjust a main flow rate of the main fuel and has a main fuel flow coefficient between approximately 3.0 to 5.0;
a water inlet port configured to receive water;
a water passage coupled to the water inlet port and configured to route the water to the first mixing tee, wherein the first mixing tee is configured to mix the main fuel and the water to generate a main fuel mixture;
a main fuel mixture outlet port configured to discharge the main fuel mixture;
a first water valve coupled to the water passage, wherein the first water valve is configured to adjust a first water flow rate of the water and has a first water flow coefficient between approximately 3.5 to 5.0, the main fuel valve and the first water valve are proximate to one another;
a pilot fuel inlet port configured to receive a pilot fuel;
a pilot fuel passage coupled to the pilot fuel inlet port and configured to route the pilot fuel to a second mixing tee;
a pilot fuel valve coupled to the pilot fuel passage, wherein the pilot fuel valve is configured to adjust a pilot flow rate of the pilot fuel and has a pilot fuel flow coefficient between approximately 1.0 to 1.5;
a second water passage coupled to the water inlet port and configured to route the water to the second mixing tee, wherein the second mixing tee is configured to mix the pilot fuel and the water to generate a pilot fuel mixture;
a pilot fuel mixture outlet port configure to discharge the pilot fuel mixture; and
a second water valve coupled to the second water passage, wherein the second water valve is configured to adjust a second water flow rate of the water and has a second water flow coefficient between approximately 0.4 to 0.55, the pilot fuel valve and the second water valve are proximate to one another;
a fuel manifold having a plurality of fuel outlets, wherein each fuel outlet of the plurality of fuel outlets is coupled to the main fuel inlet port of a respective valve assembly of the plurality of interconnected valve assemblies, and the fuel manifold is configured to provide the main flow rate of the main fuel to each of the plurality of interconnected valve assemblies with variations in the main flow rate based on the plurality of different vertical positions; and
a water manifold having a plurality of water outlets, wherein each water outlet of the plurality of water outlets is coupled to the water inlet port of a respective valve assembly of the plurality of interconnected valve assemblies, and the water manifold is configured to provide the first water flow rate of the water to each of the plurality of interconnected valve assemblies with variations in the first water flow rate based on the plurality of different vertical positions.

2. The system of claim 1, wherein a ratio of the first water flow coefficient to the main fuel flow coefficient is between approximately 0.9:1 to 1.15:1.

3. The system of claim 1, wherein a ratio of the second water flow coefficient to the pilot fuel flow coefficient is between approximately 2:1 to 3:1.

4. The system of claim 1, wherein the pilot fuel and the main fuel comprise liquid fuels.

5. The system of claim 1, wherein a first diameter of the main fuel inlet port is greater than a second diameter of the pilot fuel inlet port.

6. The system of claim 1, wherein the main fuel inlet port and water inlet port are disposed on a first side of each of the plurality of interconnected valve assemblies, the main fuel mixture outlet port is disposed on a second side of each of the plurality of interconnected valve assemblies, and the first and second sides of each of the plurality of interconnected valve assemblies are located opposite from one another.

7. The system of claim 1, wherein the first water valve is configured to flow water through the main fuel valve and the main fuel passage to purge the main fuel from the interconnected valve assembly when the main fuel mixture is not being used.

8. The system of claim 1, wherein values of the first water flow coefficient and the main fuel flow coefficient reduce the variations in the main flow rate and reduce the variations in the first water flow rate caused at least partially by the plurality of different vertical positions among the plurality of interconnected valve assemblies.

9. The system of claim 1, wherein a ratio of the first water flow coefficient to the main fuel flow coefficient is selected to reduce the variations in the main flow rate and reduce the variations in the first water flow rate caused at least partially by the plurality of different vertical positions among the plurality of interconnected valve assemblies.

10. The system of claim 1, wherein the fuel manifold and the water manifold are arranged concentrically about an axis.

11. A system, comprising:
a plurality of interconnected valve assemblies, wherein each of the plurality of interconnected valve assemblies comprises:
a main fuel inlet port configured to receive a main fuel;
a main fuel passage coupled to the main fuel inlet port and configured to route the main fuel to a first mixing tee;
a main fuel valve coupled to the main fuel passage, wherein the main fuel valve is configured to adjust a main flow rate of the main fuel and has a main fuel flow coefficient between approximately 3.0 to 5.0;
a water inlet port configured to receive water;
a water passage coupled to the water inlet port and configured to route the water to the first mixing tee, wherein the first mixing tee is configured to mix the main fuel and the water to generate a main fuel mixture;
a main fuel mixture outlet port configured to discharge the main fuel mixture;
a first water valve coupled to the water passage, wherein the first water valve is configured to adjust a first water flow rate of the water and has a first water flow coefficient between approximately 3.5 to 5.0, the main fuel valve and the first water valve are proximate to one another;
a pilot fuel inlet port configured to receive a pilot fuel;
a pilot fuel passage coupled to the pilot fuel inlet port and configured to route the pilot fuel to a second mixing tee;
a pilot fuel valve coupled to the pilot fuel passage, wherein the pilot fuel valve is configured to adjust a pilot flow rate of the pilot fuel and has a pilot fuel flow coefficient between approximately 1.0 to 1.5;
a second water passage coupled to the water inlet port and configured to route the water to the second mixing tee, wherein the second mixing tee is configured to mix the pilot fuel and the water to generate a pilot fuel mixture;
a pilot fuel mixture outlet port configure to discharge the pilot fuel mixture; and
a second water valve coupled to the second water passage, wherein the second water valve is configured to adjust a second water flow rate of the water and has a second water flow coefficient between approximately 0.4 to 0.55, the pilot fuel valve and the second water valve are proximate to one another.

12. A system, comprising:
a plurality of interconnected valve assemblies disposed at a plurality of different vertical positions, wherein each of the plurality of interconnected valve assemblies comprises:
a main fuel valve having a main fuel flow coefficient between approximately 3.0 to 5.0;

a first water valve having a first water flow coefficient between approximately 3.5 to 5.0;
a first mixing region configured to mix a main fuel from the main fuel valve and a water from the first water valve;
a pilot fuel valve having a pilot fuel flow coefficient between approximately 1.0 to 1.5;
a second water valve having a second water flow coefficient between approximately 0.4 to 0.55; and
a second mixing region configured to mix a pilot fuel from the pilot fuel valve and the water from the second water valve
wherein each of the plurality of interconnected valve assemblies is configured to receive the main fuel with a variation in a main flow rate based on the plurality of different vertical positions; and
wherein each of the plurality of interconnected valve assemblies is configured to receive the water with a variation in a first water flow rate based on the plurality of different vertical positions.

13. The system of claim 12, comprising:
a fuel manifold coupled to the plurality of interconnected valve assemblies, wherein the fuel manifold is configured to provide the main flow rate of the main fuel to each of the plurality of interconnected valve assemblies with the variation in the main flow rate based on the plurality of different vertical positions; and
a water manifold coupled to the plurality of interconnected valve assemblies, wherein the water manifold is configured to provide the first water flow rate of the water to each of the plurality of interconnected valve assemblies with the variation in the first water flow rate based on the plurality of different vertical positions.

14. The system of claim 12, wherein values of the first water flow coefficient and the main fuel flow coefficient reduce the variation in the main flow rate and reduce the variation in the first water flow rate caused at least partially by the plurality of different vertical positions among the plurality of interconnected valve assemblies.

* * * * *